No. 820,194. PATENTED MAY 8, 1906.
G. A. HOFFMAN.
TAP STOCK.
APPLICATION FILED JUNE 20, 1905.

Witnesses:—
Louis H. Buck.
James M. Fox

Inventor:—
Geo. H. Hoffman
by Chas. N. Butler
Attorney

ANDREW B. GRAHAM CO., PHOTO-LITHOGRAPHERS, WASHINGTON, D. C.

UNITED STATES PATENT OFFICE.

GEORGE A. HOFFMAN, OF PHILADELPHIA, PENNSYLVANIA, ASSIGNOR TO JOSEPH HILL BRINTON, OF PHILADELPHIA, PENNSYLVANIA.

TAP-STOCK.

No. 820,194.     Specification of Letters Patent.     Patented May 8, 1906.

Application filed June 20, 1905. Serial No. 266,106.

*To all whom it may concern:*

Be it known that I, GEORGE A. HOFFMAN, residing at Philadelphia, in the county of Philadelphia and State of Pennsylvania, have invented certain Improvements in Tap-Stocks, of which the following is a specification.

This invention is a tap-stock providing an improved flexible connection between the driving mechanism and the tap to permit the tap to stop or lag when for any cause it meets with excessive resistance to its action.

The leading purpose of the improvements is to produce a device of such character having a simple, efficient, and inexpensive construction.

Figure 1:
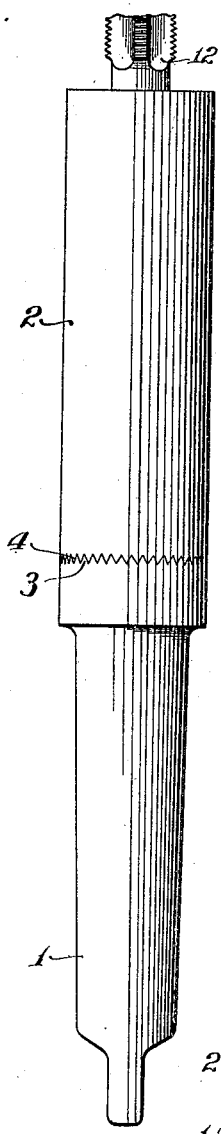
Figure 2:
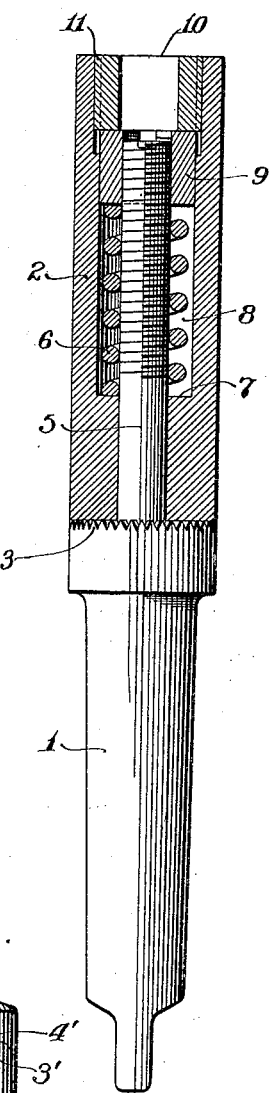
Figure 4:
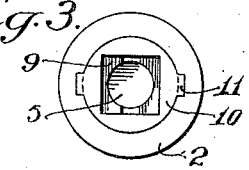
Figure 3:
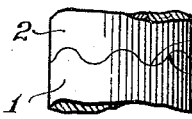

In the accompanying drawings, Figure 1 is a side view of the invention. Fig. 2 is a view of the same, partially in section. Fig. 3 is a top plan view thereof, and Fig. 4 is a view of a modified form of clutch that may be used therewith.

The mechanism comprises a shank 1, adapted to be connected to and revolved by a drilling or tapping machine, and a sleeve 2, flexibly connected to the shank and adapted to be revolved thereby to revolve the tap. The means for connecting the two sections 1 and 2 consist of the serrations 3 of the shank and the registering serrations 4 of the sleeve for clutching the two parts together, the stem 5 integrally connected to the shank and disposed axially in the sleeve, which has a revoluble bearing thereon, the coiled spring 6 impinging on the bearing 7 at the bottom of the socket 8 of the sleeve, the nut 9 screwed on the end of the stem and engaging the spring, and the chuck 10 engaged by the spline 11 to the sleeve so as to rotate therewith and move longitudinally therewith for holding the tap 12.

The parts 1 and 2 may be provided with different forms of engaging or clutching teeth, as those having reversely-curved registering surfaces 3' and 4', in which the tendency to wear is reduced.

The nut 9 provides for adjusting the tension of the spring 6 to effect the degree of frictional resistance which it is desired to oppose to the slipping of the clutch mechanism engaging the stem 1 and sleeve 2. This resistance is made sufficient to drive the tap 12 in its normal operations from the stem 1 through the sleeve 2, but not to drive it against a resistance that would strain it to the breaking-point. When the tap has reached the bottom of the hole to be threaded or when otherwise an excessive resistance is opposed to its further movement, the clutching members of the shank slip on those of the sleeve, which remains stationary while the shank continues to revolve.

It will be understood that this stock, designed particularly for operating taps, may be used for operating drills or other devices of like action.

Having described my invention, I claim—

1. A tap-stock comprising a member having a clutching device rigidly fixed thereto, a second member having a clutching device rigidly fixed thereto and engaging said first clutching device, a stem connected to one of said members and having the other of said members sleeved thereon, and a spring within and engaged to said last-named member and said stem for pressing said members together, said construction permitting one of said members to reciprocate longitudinally with reference to the other.

2. A stock comprising a shank having a threaded stem and a clutching member fixed thereto, a recessed sleeve revoluble on said stem and having a clutching member fixed thereto for engaging said first clutching member, a coiled spring in the recess of said sleeve and engaging the bottom thereof, a nut adjustable on said stem and engaging said spring, and a chuck engaged to said sleeve.

In testimony whereof I have hereunto set my hand, this 10th day of June, 1905, in the presence of the subscribing witnesses.

GEORGE A. HOFFMAN.

Witnesses:
    LOUIS H. BUCK,
    J. EDGAR BUTLER.